US008366366B2

(12) United States Patent
Hirabayashi et al.

(10) Patent No.: US 8,366,366 B2
(45) Date of Patent: Feb. 5, 2013

(54) FIXING DEVICE FOR ROTARY BLADE

(75) Inventors: Shinji Hirabayashi, Anjo (JP); Naoyuki Kojima, Anjo (JP)

(73) Assignee: Makita Corporation, Anjo-Shi (JP)

( * ) Notice: Subject to any disclaimer, the term of this patent is extended or adjusted under 35 U.S.C. 154(b) by 544 days.

(21) Appl. No.: 12/450,354

(22) PCT Filed: Mar. 21, 2008

(86) PCT No.: PCT/JP2008/055230

§ 371 (c)(1), (2), (4) Date: Oct. 6, 2009

(87) PCT Pub. No.: WO2008/117741

PCT Pub. Date: Oct. 2, 2008

(65) Prior Publication Data

US 2010/0047036 A1 Feb. 25, 2010

(30) Foreign Application Priority Data

Mar. 27, 2007 (JP) ................................ 2007-081278

(51) Int. Cl.
*F16B 35/06* (2006.01)

(52) U.S. Cl. ......................... 411/402; 411/408; 411/409

(58) Field of Classification Search .................. 411/383, 411/402, 408, 409, 432, 434–435; 83/481
See application file for complete search history.

(56) References Cited

U.S. PATENT DOCUMENTS 4,005,622 A * 2/1977 Bassett ........................ 81/124.7
4,779,382 A * 10/1988 Rudolf et al. ................. 451/342
4,989,374 A * 2/1991 Rudolf et al. ................. 451/342
5,058,909 A * 10/1991 Rudolf et al. ..................... 279/8
5,075,976 A * 12/1991 Young ............................ 30/391
5,494,368 A 2/1996 Matthews
5,601,483 A * 2/1997 Rudolf et al. ................. 451/359
5,947,671 A 9/1999 Kanaan et al.
6,148,526 A 11/2000 Kirn et al.
6,843,627 B2 1/2005 Childs et al.
6,910,694 B2 6/2005 Hartmann et al.
7,013,987 B2 * 3/2006 Nock et al. .................... 173/213
2003/0000717 A1 1/2003 Hofmann et al.

(Continued)

FOREIGN PATENT DOCUMENTS

DE 19 36 720 A1 2/1971
EP 1 375 094 AI 1/2004

(Continued)

OTHER PUBLICATIONS

Notification of Reasons for Rejection issued in Japanese Patent Application No. 2007-081278; mailed Dec. 27, 2011; with English-language translation.

(Continued)

*Primary Examiner* — Roberta Delisle

(74) *Attorney, Agent, or Firm* — Oliff & Berridge, PLC

(57) ABSTRACT

A saw blade fixing device is constructed so that a screw flange of a screw body tightened into a screw hole of a spindle is made to have a truncated cone shape, an operating lever is provided to be operable to pivot to a received position and a use position by reversing the operating lever between front and back sides, and this operating lever does not protrude from the truncated cone shape when it is received.

9 Claims, 8 Drawing Sheets

U.S. PATENT DOCUMENTS

| | | | |
|---|---|---|---|
| 2003/0136010 | A1 | 7/2003 | Childs et al. |
| 2006/0096436 | A1 | 5/2006 | Phillips et al. |
| 2006/0123968 | A1 | 6/2006 | Chiu |

FOREIGN PATENT DOCUMENTS

| | | | |
|---|---|---|---|
| JP | A-02-145211 | | 6/1990 |
| JP | A-06-503634 | | 4/1994 |
| JP | A-07-299743 | | 11/1995 |
| JP | A-2000-504282 | | 4/2000 |
| JP | A-2001-520734 | | 10/2001 |
| JP | A-2003-025145 | | 1/2003 |
| JP | A-2004-513797 | | 5/2004 |
| WO | WO 92/04549 | A1 | 3/1992 |
| WO | WO 99/39109 | A1 | 8/1999 |
| WO | WO 2007/012882 | A1 | 2/2007 |

OTHER PUBLICATIONS

Jun. 11, 2012 Extended European Search Report issued in European Application No. 08722594.2.

* cited by examiner

FIXING DEVICE FOR ROTARY BLADE

BACKGROUND OF THE INVENTION

1. Field of the Invention

The present invention relates to a fixing device (tool-less blade clamp) for fixing a rotary blade such as a saw blade to a spindle without the use of a special tool in a rotary tool such as, for example, a portable circular saw.

2. Description of the Related Art

Conventionally, as a technique relating to this kind of fixing devices, for example, a tool-less blade clamp assembly (fixing screw) which can be manually loosened without using a tool by utilizing a ratchet mechanism in order to prevent over-tightening is described in U.S. Pat. No. 6,843,627.

In addition, in Japanese Laid-Open Patent Publication No. 2001-520734, a retractable lever is provided in a fixing nut tightened to a threaded shaft part of a spindle, and the fixing nut can be tightened to the threaded shaft part of the spindle with a large torque while this lever is grasped, thereby enabling a user to firmly fix a rotary blade to the spindle without using a special tool such as a spanner, etc. After the tightening has been completed, the lever is retracted not to extend from the fixing nut so as not to interfere with the rotational movement of the rotary blade. Further, also in the case that the fixing nut is loosened, it is possible to pull out this lever and rotate the fixing unit in the loosening direction with a large torque, so that a user can manually loosen the fixing nut and remove the rotary blade without using a special tool.

However, though a fixing screw described in U.S. Pat. No. 6,843,627 is characterized document does not disclose a technique for tightening it firmly.

Further, the technique described in Japanese Laid-Open Patent Publication No. 2001-520734 provides a fixing nut for fixing a saw blade to a spindle of a cutting machine body. Though this fixing nut can be tightened and loosened with a large torque, Japanese Laid-Open Patent Publication No. 2001-520734 does not disclose a technique for its compactification with respect to a radial direction or a thickness direction.

Therefore, there is a need in the art for a fixing device for manual rotational operation of a user, which can be tightened or loosened with a large torque and is compactified with respect to its radial direction or thickness direction to enable an adequate cutting depth when performing a so-called oblique cutting operation in a portable circular saw.

SUMMARY OF THE INVENTION

According to a first aspect of the invention, the operating lever is provided without increase in size of the screw body with respect to its radial direction and thickness direction, and therefore, when it is applied to an existing portable circular saw, a sufficient cutting depth of the saw blade can be ensured while an inclination angle of the portable circular saw body is maintained when an oblique cutting operation is performed. In addition to this, a function as a tool-less clamp (a fixing device which needs no tool) can be given.

More specifically, a large rotational force can be applied to the screw body by taking out an operating lever of the fixing device to its use position and applying a torque to the screw body via this lever, and therefore, the screw body can be tightened firmly without the use of a special tool.

Further, the screw flange has a truncated cone shape and the operating lever is received without protruding from the peripheral edge of the screw flange. Thus, if the rotary tool is a portable circular saw including a main body having a saw blade, and a base which tiltably supports this main body, a protruding distance of the saw blade toward a lower surface side of the base, that is a cutting depth, can be ensured to be sufficient while the main body is inclined with respect to the base to incline the saw blade at a predetermined angle within a range that does not cause interference of the fixing device with the base.

Thus, by applying the first aspect of the invention to an existing portable circular saw, a tool-less function can be added without sacrificing a cutting depth when an oblique cutting operation is performed.

With regard to an outer configuration of the screw flange, it does not need to have an exactly (accurately) truncated cone shape. The key is that the screw flange needs to be tapered so that its leading portion side becomes thin, enabling prevention of interference between the fixing device and the other parts when the rotary tool is inclined, and enabling setting of an inclination angle of the rotary tool to be large.

According to a second aspect of the invention, the operating lever is received within the lever receiving concave part in the state where it does not protrude from the peripheral edge of the screw flange when viewed not only from the front side but also from the lateral side. Thus, the fixing device can be configured to be compact in its thickness direction and radial direction, so that an inclination angle of the rotary tool body can be set to be large.

According to another aspect of the invention, a user can take the operating lever out of the lever receiving concave part to its use position against the biasing force, and when the user releases the operating lever which is taken out to its use position, it returns to the received position automatically. In this respect, the usability of the fixing device can be improved.

According to another aspect of the invention, a rotational torque (rotational operating force) applied in the tightened direction or loosening direction to the screw body via the operating lever can be efficiently applied to a screw shaft portion. More specifically, a rotational torque applied to the screw body by a user is not consumed as a friction resistance (rotational resistance) between the screw flange and the outer flange, but substantially the entire torque is applied to the screw shaft portion. In this respect, a necessary rotational torque to tighten or loosen the screw shaft portion can be reduced, so that a necessary rotational operating force can be further reduced.

According to another aspect of the invention, the outer flange and the inner flange are integrated with respect to the rotation, for example, by fitting them with a two surface width portion of the spindle.

According to another aspect of the invention, the rotary blade can be reliably and easily mounted coaxially to the spindle via the inner flange.

According to another aspect of the invention, an operating force in the taking out direction and a retaining force in its taking-out position applied to the operating lever by a user can be received dispersedly at two points of the support shaft and the receiving base.

According to another aspect of the invention, since an operating force in the rotational direction of the screw applied by a user via the operating lever can be received at either side in the width direction of the lever receiving concave part, a load applied to the support shaft can be reduced.

According to another aspect of the invention, an accidental uplifting of the operating lever in the rising direction accompanying the high-speed rotation of the saw blade can be prevented.

DETAILED DESCRIPTION OF THE INVENTION

Figure 1:
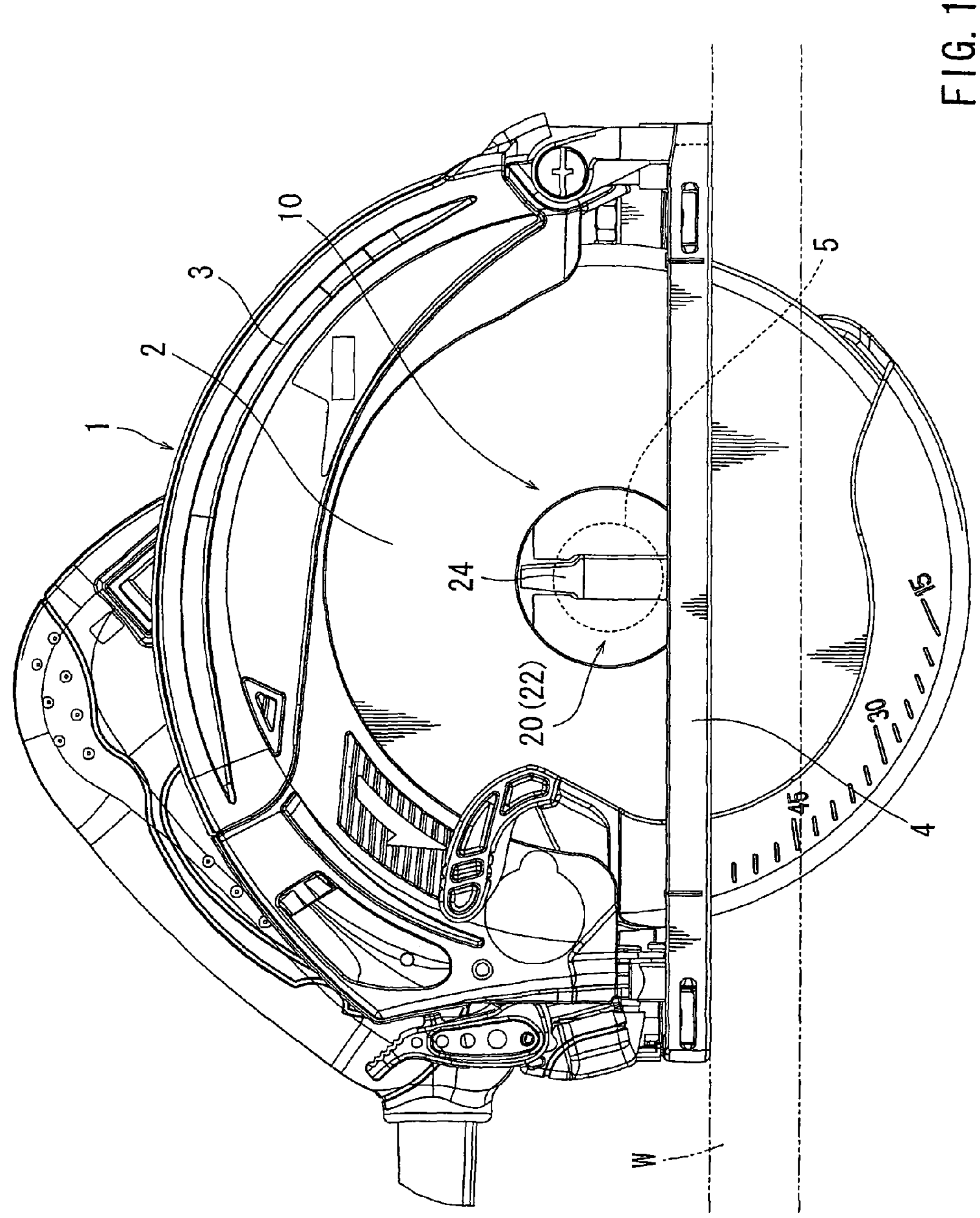
FIG. 1 is a front view of a portable circular saw incorporating a fixing device according to an embodiment of the present invention.

Next, an embodiment of the present invention will be described with reference to FIGS. 1 to 8. FIG. 1 shows a portable circular saw 1 with a circular saw blade 2 fixed by using a fixing device 10 of this embodiment. The present embodiment exemplifies the portable circular saw 1 as an example of rotary tools, and the circular saw blade 2 as an example of rotary blades. The constitution of the portable circular saw 1 itself is similar to that known in the prior art and requires no particular modification in the present embodiment. The periphery of an upper half circumference of the saw blade 2 is covered with a blade case 3. A driving motor and a speed-reducing mechanism is located at the backside of this blade case 3. An output of this driving motor is transmitted via the speed-reducing mechanism into a spindle 5 protruding into the blade case. In order to fix the saw blade 2 to this spindle 5, the fixing device 10 is used as described below.

Symbol 4 in FIG. 1 designates a base adapted to contact with a cut material W. The blade case 3 is supported on the upper surface of this base 4, and the lower side of the saw blade 2 protrudes on a lower surface side of this base 4. The cut material is cut by this protruding portion. The blade case 3 is supported by the base so as to be capable of tilting upward and downward, so that a protruding distance of the saw blade can be changed for adjusting a cutting depth for the cut material. Further, the blade case 3 is supported on the base 4 so as to be capable of tilting in right and left directions with respect to a cutting direction (a direction intersecting the sheet face). Normally, by tilting the blade case 3 in the direction of displacing the upper side of the saw blade 2 toward a front side (right side with respect to a cutting proceeding direction), a so-called oblique cutting operation can be performed. Also for these cutting-depth adjustment mechanism and oblique-cutting mechanism, techniques known in the art are used.

Figure 2:
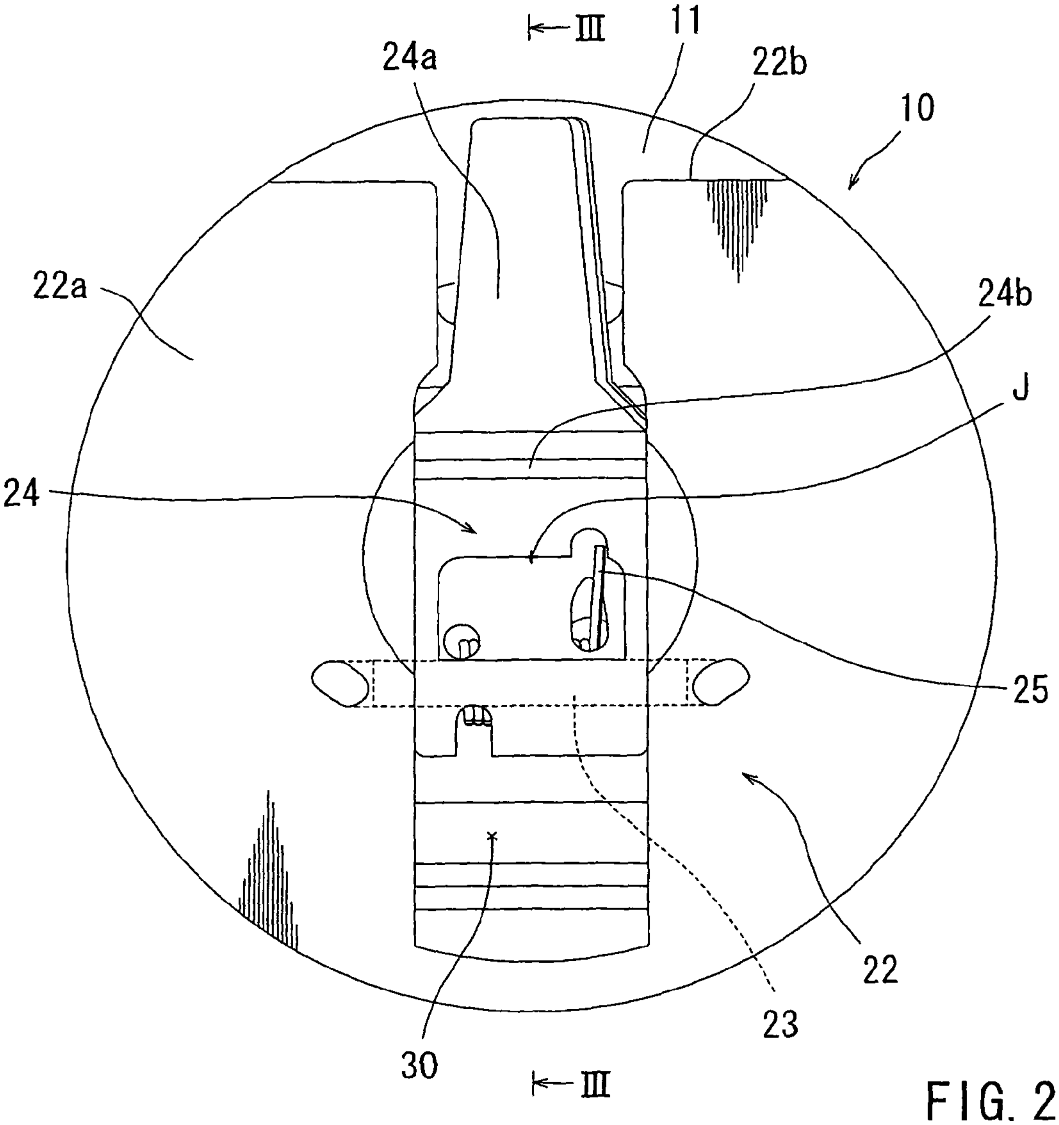
FIG. 2 is a front view of a fixing device, and this figure shows the state where a lever is situated at a received position.

The details about the fixing device 10 of the present embodiment are illustrated in FIG. 2 and its subsequent figures. This fixing device 10 is provided with an outer flange 11 and an inner flange 12 which clamp the saw blade 2, and a screw body 20. Both the outer flange 11 and the inner flange 12 are mounted to two surface width portions 5*b*, 5*b* formed at a leading end of the spindle 5 so as to be non-rotatable relative to the spindle 5. The outer flange 11 is brought to contact with an outer side (left side surface in FIGS. 3 and 5) of the saw blade 2, and the inner flange 12 is brought to contact with an inner side surface (right side surface in FIGS. 3 and 5).

The inner flange 12 is provided with a boss portion 12*a*. This boss portion 12*a* is inserted into a mounting-hole 2*a* of the saw blade 2 without a play.

The screw body 20 is provided with a screw shaft portion 21 tightened into a screw-hole 5*a* of the spindle 5, and screw flange portion 22 extending from a head side (left end side in FIG. 3) of this screw shaft portion 21 to its surrounding.

The screw flange portion 21 has a truncated cone shape with its outer circumference surface (conical surface) inclined in such a direction that its diameter increases toward the outer flange 11. An operating lever 24 is supported on the outer surface side of this screw flange 22 via a support shaft 23 so as to be operable to pivot. Around the support shaft 23, a torsion spring 25 is interposed between the operating lever 24 and the screw flange portion 22. Through this torsion spring 25 the operating lever 24 is biased toward the side of its storage position (a position illustrated in FIGS. 2 and 3) that will be described later.

Figure 3:
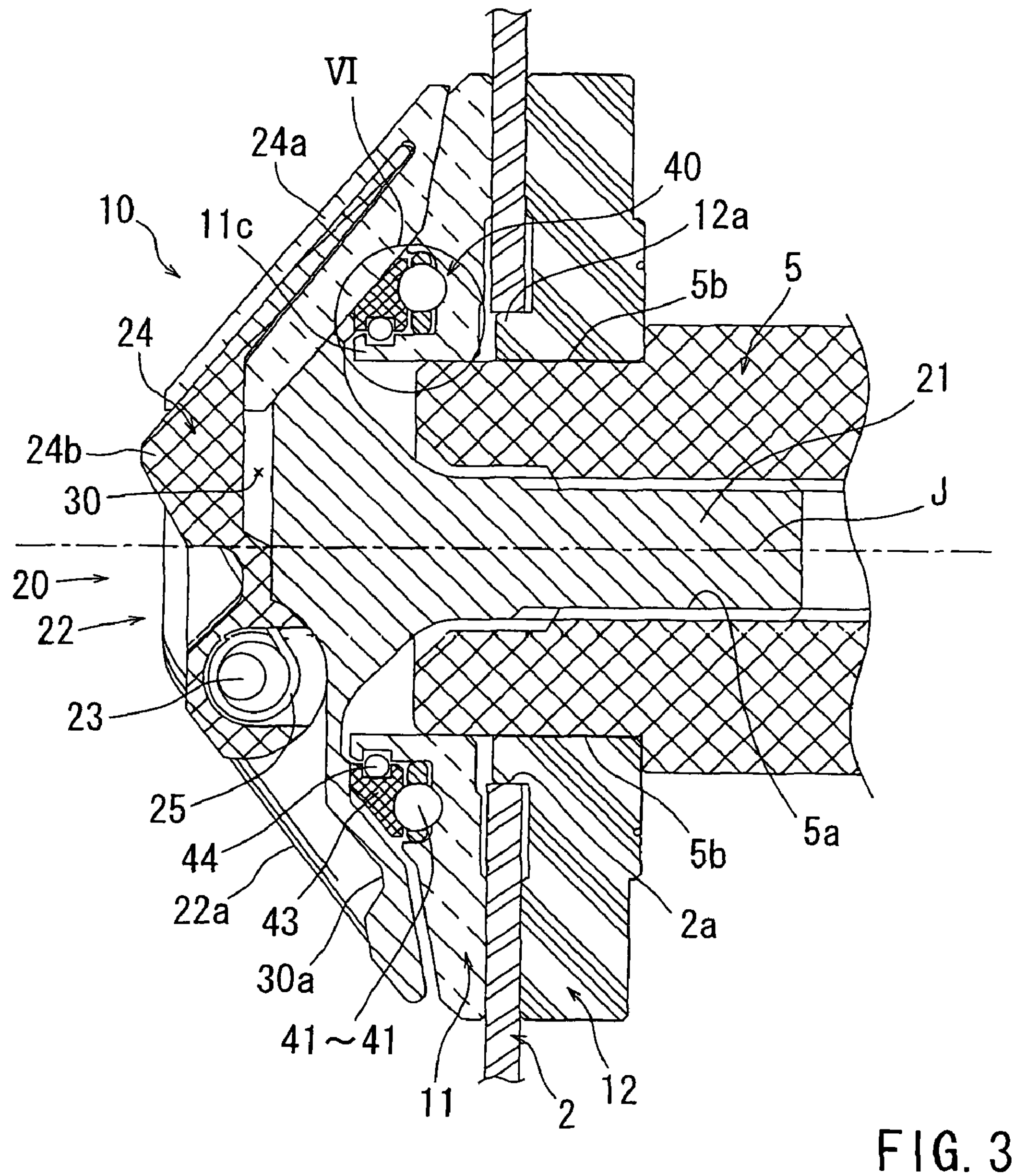
FIG. 3 is a sectional view taken along arrows (III)-(III) of FIG. 2 and is a vertical sectional view of the fixing device.
Figure 5:
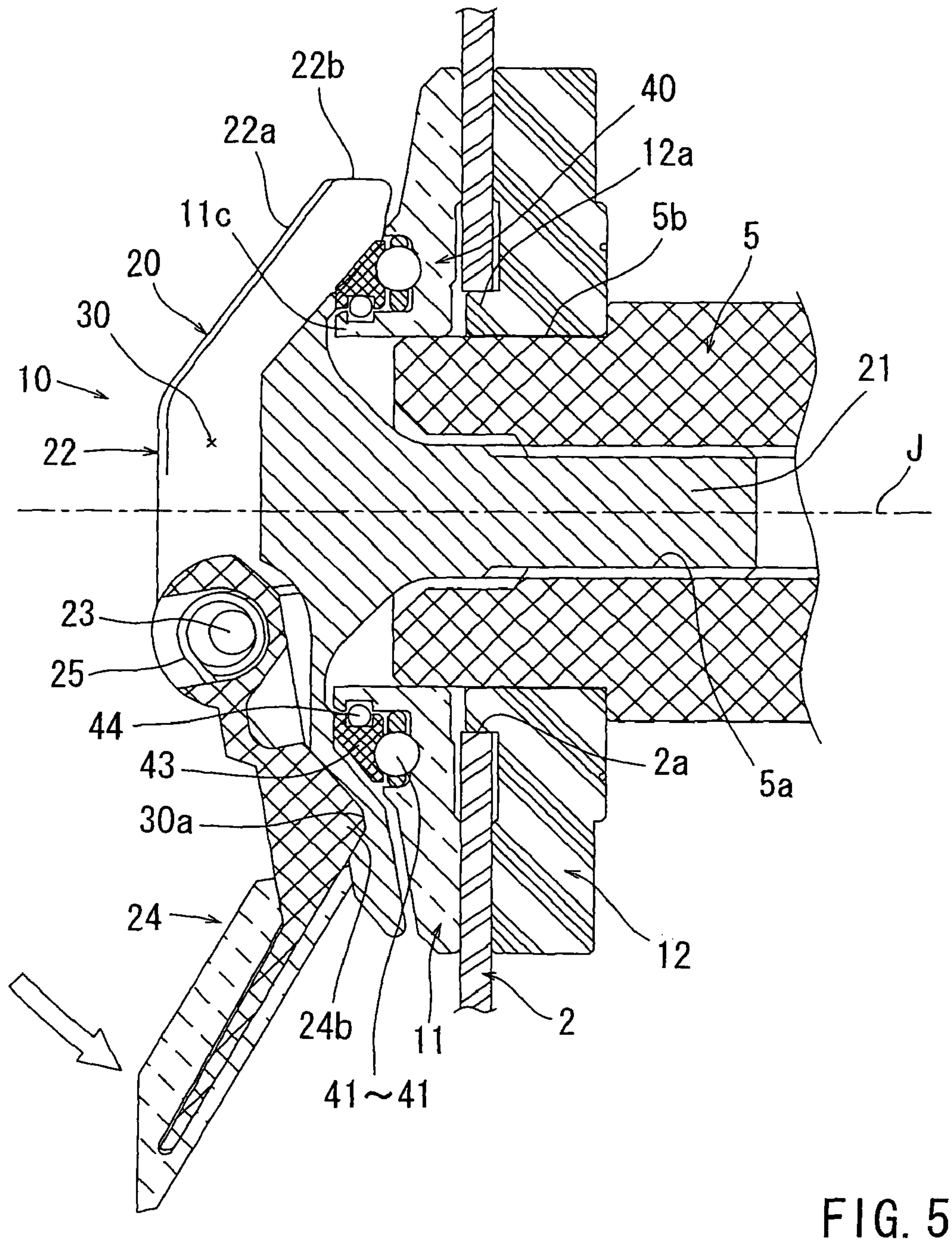
FIG. 5 is a sectional view taken along arrows (V)-(V) of FIG. 4 and is a vertical sectional view of the fixing device.

A lever receiving concave part 30 is provided on the outer surface of the screw flange portion 22. As illustrated in FIG. 3, when the operating lever 24 is situated in its storage position, it is received within the lever receiving concave part 30 without protruding from a conical surface 22*a*. On the contrary, when the operating lever 24 is taken out to its use position against the torsion spring 25 as illustrated in FIG. 5, a substantial part of the operating lever protrudes from the lever receiving portion 30 to result in a state of largely protruding radially from the screw flange portion 22. If the user takes out the operating lever 24 too its use position against the torsion spring 25 with fingertips and then releases the fingertips in the state of the lever being taken out to this use position, the operating lever 24 returns to its storage position by the torsion spring 25.

Figure 4:
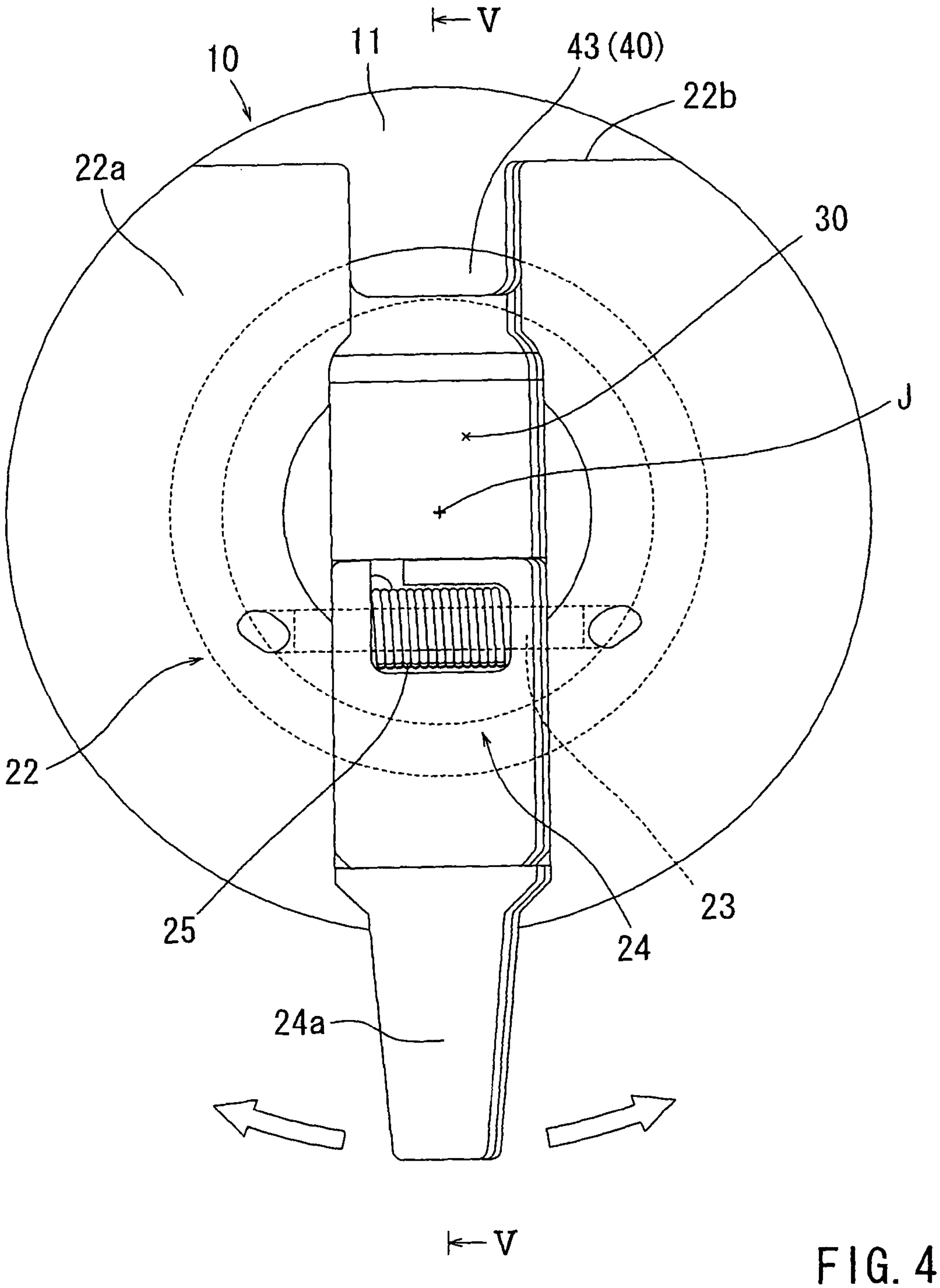
FIG. 4 is a front view of the fixing device, and this figure shows the state where the lever is taken out to a use position.

As illustrated in FIGS. 3 and 5, a leading end side of the operating lever 24 is covered with a resin cover 24*a*. Further, as illustrated in FIGS. 2 and 4, a width size on the leading end side of the operating lever 24 decreases gradually. Meanwhile, an upper portion as viewed in FIGS. 2 and 4 of the screw flange portion 22 is removed (removed portion 22*b*), and therefore, in the state where the operating lever 24 is situated in its received position (the state shown in FIG. 2), its leading portion slightly protrudes from the removed portion 22*b* of the screw flange portion 22. The user can pinch this protruding portion with fingertips in order to easily take the operating lever 24 out of its received position into its use position.

The operating lever 24 has a shape bent into a substantially angle shape (V shape) to conform to the truncated cone shape of the screw flange portion 22, and is provided with a receiving base 24*b* having an angle-shaped (V-shaped) cross section around its bent leading end. As illustrated in FIG. 5, when the operating lever 24 is taken out to its use position, this receiving base 24*b* closely fits into a receiving concave part 30*a* having a substantially angle shape (V shape) and formed at the bottom of the lever receiving concave part 30, and therefore, an external force applied in a taking-out direction to the operating lever 24 taken out to its use position (a pressing force in the direction indicated by an outline arrow shown in FIG. 5) can be received at the screw flange portion 22.

Further, the width size of the operating lever 24 is set to have such a width size that enables to be received in the lever receiving concave part 30 without a play. Therefore, in a state where the operating lever 24 is taken out to its use position as illustrated in FIG. 4, the operating lever 24 fits into the lever receiving concave part 30 without a play with respect to the width direction. Hence, when an external force is applied in a screw-rotating direction to the operating lever 24 which is taken out to its use position (in the direction indicated by the outline arrow shown in FIG. 4), this force is received at either side of the lever housing concave part 30, so that a load applied to the side of the support shaft 23 is reduced.

Figure 6:
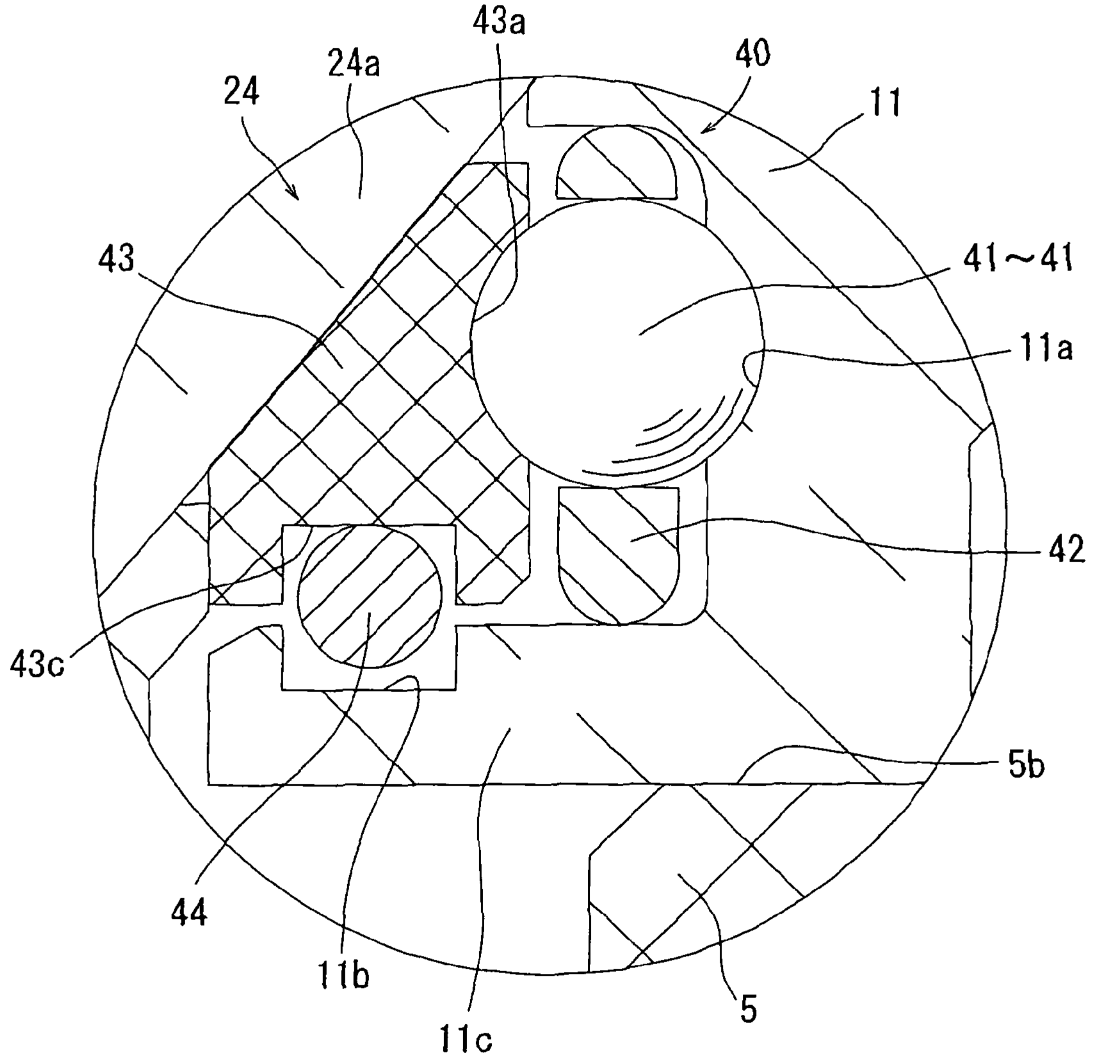
FIG. 6 is an enlarged view of a portion (VI) in FIG. 3 and is a vertical sectional view of a friction-reducing element.

A friction-reducing element 40 is clamped between the screw flange 22 and the outer flange 11. The details of this friction-reducing element 40 are illustrated in FIG. 6. This friction-reducing element 40 is provided with a number of steel balls 41-41, a retaining ring 42 which retains the steel balls at regular intervals on the same circle about an axis line J, and a metal cover 43 which restricts a positional offset of these steel balls in the direction of the axis line J. Each steel ball 41 fits into a rolling motion groove 11*a* provided in the outer flange 11.

Further, the metal cover 43 has an annular shape along the retaining ring 42 and is provided with a rolling motion groove 43*a* disposed on its side surface and facing the above rolling motion groove 11*a* in the outer flange 11. Each steel ball 41 also fits into this rolling motion groove 43*a*. Each steel ball 41 is held between the rolling motion groove 11*a* in the outer flange 11 and the rolling motion groove 43*a* in the metal cover 43.

Further, an engagement groove 43*c* is formed in the inner circumference of the metal cover 43 over its entire circumferences. Facing this engagement groove 43*c*, an engagement groove 11*b* is formed in the outer circumference of a boss portion 11*c* of the outer flange 11 over its entire circumferences. A rubber ring 44 is fitted to extend between both the engagement groove 43*c* in the metal cover 43 and the engagement groove 11*b* in the outer flange 11. By way of this rubber ring 44, the metal cover 43 is retained on the outer circumference side of the boss portion 11*c* of the outer flange 11, and eventually the friction-reducing element 40 is retained.

During the relative rotation of the screw flange 22 to the outer flange 11 accompanying the movement for tightening and loosening the screw body 20 with respect to the spindle 5, each steel ball 41 rolls along the rolling motion groove 11*a* and the friction between both 22 and 11 is considerably reduced, and hence the screw body 20 can be tightened firmly against the screw hole 5*a* of the spindle 5 with a small operating force, and can be loosened in an opposite manner.

Figure 7:
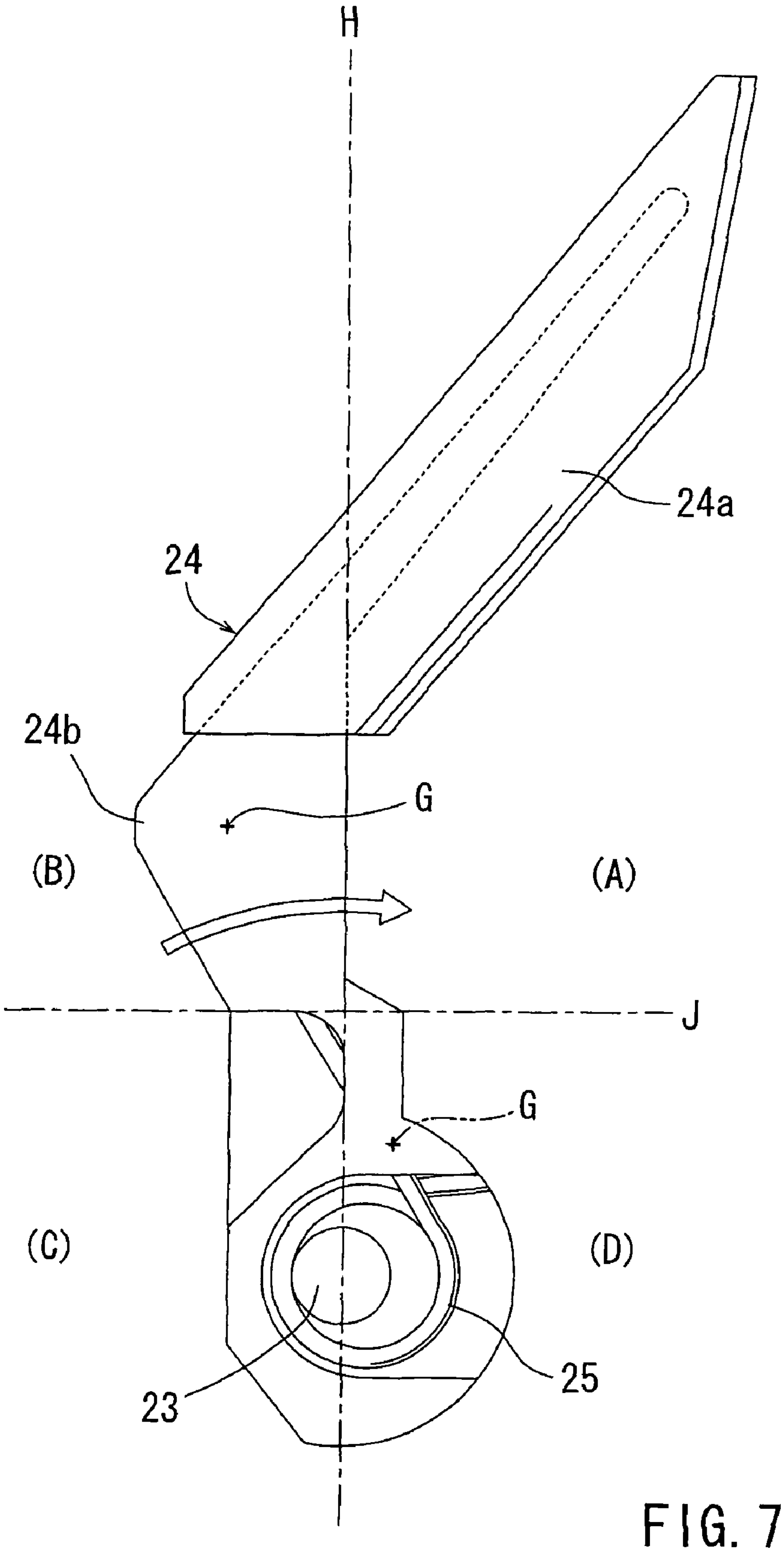
FIG. 7 is a side view of the lever. It can be understood from this figure that a direction of application of a centrifugal force differs according to the relation between a position of the center of gravity of the lever and four areas sectioned under given conditions.

Next, the shape of the operating lever 24 or its weight distribution is set appropriately so that the position of a gravity center G of the operating lever 24 meets the following condition. As illustrated in FIG. 7, assuming four areas (A), (B), (C) and (D) sectioned by the axis line J (the axis line for rotation of the spindle 5) of the screw shaft portion 21 of the screw body 20 and by a reference line H perpendicular to this axis line J and passing through the rotational center of the operating lever 24 (an axis line of the support shaft 23), the position of the gravity center G of the operating lever 24 situated at the received position is set to be placed within the area (B) or (D). In the present embodiment, the shape of the operating lever 24 or its weight distribution is appropriately set so that the gravity center G of the operating lever 24 is placed within the area (B) and proximal to the receiving base 24*b* having the angle shape.

Since the position of the center of gravity G of the operating lever 24 is set as such, a centrifugal force produced while the saw blade 2 rotates at a high speed is applied as a force retaining the operating lever 24 in the received position (in a clockwise direction indicated by an outline arrow in FIG. 7). This enables the operating lever 24 to be retained firmly in the received position without need of additionally providing a retaining means such as a plunger, etc., and hence, it is possible to reliably prevent the operating lever 24 from being accidental pivoted toward a raising direction (toward the use position side) accompanying the high-speed rotation of the saw blade 2.

According to the fixing device 10 of the present embodiment constituted as described above, the screw body 20 is provided with the operating lever 24, and this operating lever 24 protrudes further outward from the periphery of the screw flange 22 of the screw body 20 when this operating lever 24 is taken out to the use position. Therefore, a user can rotate the screw body 20 by holding this operating lever 24 with fingertips. In this case, a greater torque can be applied to the screw flange 22 than in the case that the screw body is rotated by merely pinching the screw flange 22, and therefore, the screw body 20 can be tightened firmly against the spindle 5 and it is possible to reliably fix the saw blade 2.

Further, since the screw body 20 can be rotated in the loosening direction of the screw body 20 by the use of the operating lever 24 protruding outward from the screw flange 22, a user can loosen the screw body 22 by applying a large torque to it with a small operating force, and therefore, an operation for replacing the saw blade 2, etc. can be easily carried out.

Further, according to the fixing device 10 of the present embodiment, the screw flange 22 of the screw body 20 has a truncated cone shape and the outer flange 11 is located in the state where the outer flange 11 is substantially received within this screw flange 22 having the truncated cone shape, so that a protruding distance from the saw blade 2 of the fixing device 10 is smaller than that in the prior art and its overall configuration is of substantially truncated cone shape.

Considering this respect, even in the case that the rotational axis line (screw axis J) of the saw blade 2 is set to be nearer to the base 4 (low position) in height and a protruding distance (cutting depth) of the saw blade 2 toward the lower surface side of the base 4 is set to be large, a circular saw body (circular saw 2) can be tilted by 50 degrees with respect to the base 4 the same way in the prior art while avoiding interference with the base 4 of the fixing device 10, and therefore, according to the fixing device 10 of the present embodiment, the cutting depth of the saw blade 2 (the protruding distance from the lower surface of the base 4) can be set to be larger by setting the rotational axis line J to be lower without sacrificing an inclination angle when an oblique cutting operation is performed. This respect is shown in FIG. 8.

Figure 8:
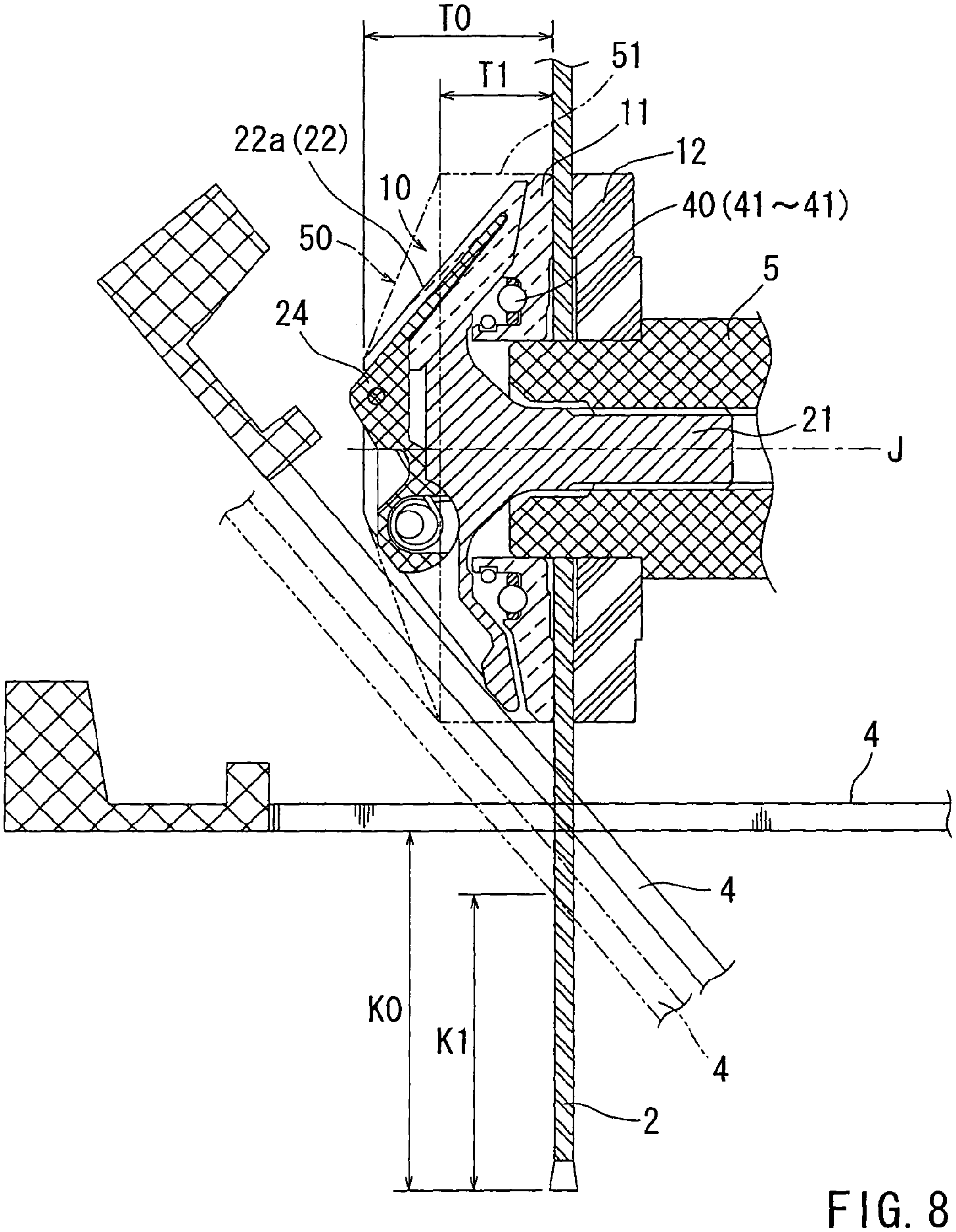
FIG. 8 is a vertical sectional view of the fixing device and its surroundings. It can be understood from this figure that a cutting depth when performing an oblique cutting operation differs depending on the size of the fixing device.

In FIG. 8, a fixing device 50 is illustrated to have a cylindrical part 51 that is large in thickness T1 as its whole configuration due to a cylindrical outer flange having a relatively large thickness size, which is different from the outer flange 11 of the fixing device 10 of the illustrated embodiment, and other members. In the case of this fixing device 50, even in the case that a protruding distance T0 from the saw blade 2 and a radial size are the same as those of the fixing device 10 of the present embodiment, the protruding amount from the conical surface 22*a* of the flange 22 of the present embodiment becomes large as illustrated in the figure by two-dot chain lines, and therefore, it is necessary to keep an inclination angle of 50 degrees in the case of an oblique cutting operation by increasing the height of the center of the screw axis line J (rotational center of the saw blade 2) from the base 4 by an amount corresponding to the protruding amount, and hence, a cutting depth K1 of the saw blade 2 becomes smaller than a cutting depth K0 in the case of the fixing device 10 of the present embodiment.

In this way, according to the fixing device 10 of the present embodiment, a user can take the operating lever 24 out into the use position and rotate the screw body via the operating lever 24 while retaining the operating lever in this use position, and therefore, the user can rotate the screw body with a large torque (operating force) by a smaller force than that in the case of rotating the screw flange 22 of the screw body 20 by pinching it directly with fingertips. Therefore, the user can firmly fix the rotary blade by firmly tightening the screw body 20 against the spindle without use of a special tool such as a driver for screw driving.

On the other hand, the user can loosen the screw body in the loosening direction with a small force by the use of the operating lever, and therefore, the user can easily carry out the operation for replacing the rotary blade.

Further, the screw flange 22 constructed to have the receiving concave part 30 in which the operating lever 24 is received not to protrude from the outer surface (conical surface) of the screw flange 22, and therefore, the protruding distance T0 from the saw blade 2 can be made as small as possible. In addition, since the outer surface of the screw flange 22 is formed into a truncated cone, the size in the radial direction of the fixing device 10 (in the direction along a surface direction of the saw blade 2) can be made to be substantially small. For this reason, an inclination angle achieved when performing an oblique cutting operation by an existing portable circular saw 1 can be ensured while the cutting depth can be ensured to be sufficient as in the prior art.

As explained above, according to the fixing device 10 of the present embodiment, while ensuring a cutting depth to be sufficient when performing an oblique cutting operation (without sacrificing a cutting depth), a user can fix the saw blade 2 firmly with a small force by being provided with the operating lever 24 for the rotational operation, and on the other hand, a user can easily remove it with a small force. Therefore, by applying the fixing device 10 to an existing portable circular saw 1, it is possible to make the saw to be tool-less.

Also, according to the illustrated fixing device 10, the lever 24 is configured to be operated to pivot about the support shaft 23, and in the state where the operating lever 24 is taken out to its use position, the receiving base **24*b* is fitted in the receiving concave part 30*a* on the outer flange 11 side and is able to adequately receive a pressing force applied to the operating lever 24 in the direction indicated by the outline arrow in FIG. 5. For this reason, a user can rotate the screw body 20 in the tightening or loosening direction via the operating lever 24 while retaining it in its use position by pressing the operating lever 24 lightly with fingertips in the same direction. In this respect, good usability (operability for rotation) is ensured with respect to the rotational operation of the screw body 20 by the fixing device 10** of this embodiment.

Further, when the operating lever 24 is taken out to its use position, both sides of the lever in the width direction are brought into the state of fitting between both sides of the lever receiving concave part 30 without substantial play, and therefore, it results in a state where a play in the rotational direction of the screw axis is eliminated or reduced. For this reason, compared with a case where the entire operational force applied to the operating lever 24 in the rotational direction of the screw axis (in the direction indicated by the outline arrows in FIG. 4) is received by the support shaft 23 side, the operability for rotation of the operating lever 24 can be ensured with durability of the support shaft 23 being ensured.

Various modifications can be made to the embodiment explained above. For example, although the construction in which the steel balls 41 to 41 are used as a friction-reducing element was illustrated, instead of this construction, a construction using needle rollers or a construction of simply inserting liners having high sliding ability may be used.

Further, by an application of high-friction-coefficient treatment such as an application of a coating material containing a hard heavy metal on the surfaces (bearing surfaces) of the outer flange 11 and the inner flange 12 contacting with the saw blade 2, the friction-coefficient of both flanges 11 and 12 against the saw blade 2 can be increased, so that sliding of the saw blade 2 can be prevented more reliably.

Further, although the portable circular saw was exemplified as a rotary tool and the saw blade was exemplified as a rotary blade, the fixing device of the present invention can be extensively applied as fixing bolts for fix rotary blades for the other rotary tools, such as a desktop type circular saw machine or a hand-held grinder.

The invention claimed is:

1. A device for fixing a rotary blade to a spindle of a rotary tool, comprising:

an outer flange and an inner flange for clamping the rotary blade; and a screw body having a screw shaft portion and a screw flange, the screw shaft portion being tightened into a screw hole of the spindle, the screw flange being extended from a head side of the screw shaft portion to a circumference of the screw shaft portion and pressed against an outer surface side of the outer flange;

wherein:

the screw flange has a truncated cone shape having a larger diameter on a side of the outer flange and has an operating lever on its outer surface, the operating lever being operable to pivot between a received position and a use position by a pivotal operation in front and back reverting directions, the operating lever having a shape bent into a V configuration conforming to the truncated cone shape of the screw flange and provided with a receiving cross section around its bent leading edge; and when the operating lever is pivoted to the received position, the operating lever is received within a lever receiving concave part provided at the outer surface of the truncated cone-shaped screw flange and is received in a state where its leading end side does not protrude from a peripheral edge of the screw flange, and when the operating lever is pivoted to the use position, the receiving base of the operating lever closely fits into a receiving concave part having a V configuration and formed at the bottom of the lever receiving concave part, the operating lever being brought into a state where the leading end side protrudes from the peripheral edge of the screw flange in a radial direction, and the rotary blade can be fixed to the spindle by rotating the operating lever in a direction such that the screw shaft portion is tightened into a screw hole of the spindle.

2. The fixing device according to claim 1, wherein the operating lever is received within the lever receiving concave part in a state where it does not protrude from the outer surface of the truncated cone-shaped screw flange.

3. The fixing device according to claim 2, wherein the operating lever is biased toward a side of the received position.

4. The fixing device according to claim 1, wherein a friction-reducing element is interposed between the screw flange and the outer flange for reducing a friction resistance therebetween in a rotational direction.

5. The fixing device according to claim 1, wherein the outer flange and the inner flange are fixed to the spindle with respect to a rotation about an axis line of the spindle.

6. The fixing device accordance to claim 1, wherein the rotary blade is mounted coaxially to the spindle by inserting a boss portion of the inner flange into a mounting hole of the rotary blade.

7. The fixing device according to claim 1, wherein the fixing device is constructed such that the operating lever is supported so as to be operable to pivot between the received position and the use position relative to the screw flange via a support shaft, and when the operating lever is taken out to the use position, a receiving base having an angle-shaped cross section is brought into contact with a receiving concave part provided at the receiving concave part, so that an external force in a taking out direction toward the use position applied to the operating lever is received at two points of the receiving base and the support shaft.

8. The fixing device according to claim 1, wherein the fixing device is constructed so that in a state where the operating lever is taken out to the use position, side surfaces of the operating lever in a width direction are brought into contact with either side of the receiving concave part in the width direction, so that an external force applied to the operating lever in a screw-rotating direction can be received.

9. The fixing device according to claim 1, wherein in order to make a centrifugal force produced by a rotation of the spindle to act as an external force in a direction for retaining the operating lever on a side of the received position, a weight distribution of the operating lever is set so that a gravity center of the operating lever is situated in an area out of four areas sectioned by a rotational axis J of the spindle and a reference line H perpendicular to the rotational axis J and passing through a support shaft rotatably supporting the operating lever.

* * * * *